US012634292B2

(12) United States Patent
Soryal et al.

(10) Patent No.: US 12,634,292 B2
(45) Date of Patent: May 19, 2026

(54) PRIVATE TEMPORARY DYNAMIC SECURE NETWORKS AND FIRST RESPONDER NETWORK INTEGRATION

(71) Applicant: AT&T Intellectual Property I, L.P., Atlanta, GA (US)

(72) Inventors: Joseph Soryal, Glendale, NY (US); Elaine Sze, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 145 days.

(21) Appl. No.: 18/444,867

(22) Filed: Feb. 19, 2024

(65) Prior Publication Data

US 2025/0267150 A1      Aug. 21, 2025

(51) Int. Cl.
　　 *H04L 29/06* 　　 (2006.01)
　　 *G06Q 50/26* 　　 (2012.01)
　　 *H04L 9/40* 　　 (2022.01)

(52) U.S. Cl.
　　 CPC ......... *H04L 63/105* (2013.01); *G06Q 50/265* (2013.01); *H04L 63/083* (2013.01)

(58) Field of Classification Search
　　 None
　　 See application file for complete search history.

(56) References Cited

U.S. PATENT DOCUMENTS

| 11,070,670 | B1 * | 7/2021 | Chalton | ............... H04M 3/5116 |
| 11,863,597 | B1 * | 1/2024 | Gosztyla | ............. H04L 65/1096 |
| 12,069,063 | B1 * | 8/2024 | Thunuguntla | ....... G06F 21/6218 |
| 12,327,468 | B1 * | 6/2025 | Bartczak | .............. G08B 25/007 |
| 2013/0203376 | A1 * | 8/2013 | Maier | ..................... H04W 4/90 |
| | | | | 455/404.2 |
| 2015/0310188 | A1 * | 10/2015 | Ford | ..................... H04L 63/101 |
| | | | | 726/28 |
| 2016/0337831 | A1 * | 11/2016 | Piett | ................. H04M 3/42357 |
| 2017/0169699 | A1 * | 6/2017 | Will | ........................ H04W 4/90 |
| 2018/0060601 | A1 * | 3/2018 | Kay | ...................... H04W 12/08 |
| 2018/0301017 | A1 * | 10/2018 | Dizengof | ............. G08B 25/016 |
| 2019/0174208 | A1 * | 6/2019 | Speicher | ................. G06F 1/163 |
| 2020/0314623 | A1 * | 10/2020 | Pellegrini | ............... H04W 4/02 |
| 2021/0022211 | A1 * | 1/2021 | Routt | ...................... H04L 41/16 |
| 2022/0114142 | A1 * | 4/2022 | Madisetti | ................ G06F 16/48 |
| 2022/0247761 | A1 * | 8/2022 | Subbanna | ............... H04L 63/20 |
| 2023/0245552 | A1 * | 8/2023 | Lewis | .................. G06Q 50/265 |
| | | | | 455/404.2 |
| 2024/0015492 | A1 * | 1/2024 | Mckinley | ................. H04W 4/90 |
| 2025/0124152 | A1 * | 4/2025 | Suresh | ................ G06F 21/6218 |
| 2025/0203716 | A1 * | 6/2025 | Mardakis | .............. H04W 64/00 |

* cited by examiner

*Primary Examiner* — Shin-Hon (Eric) Chen
(74) *Attorney, Agent, or Firm* — Guntin & Gust, PLC; John G. Rauch

(57) ABSTRACT

Aspects of the subject disclosure may include, for example, receiving information defining a plurality of participants in a secure data lake, receiving access information for the plurality of participants, the access information operative to define respective access to the secure data lake for respective participants, establishing the secure data lake according to the information, wherein the establishing comprises enabling secure communication and data sharing among the participants and limiting access to only the participants, according to the access information, and terminating the secure data lake upon occurrence of a terminating condition. Other embodiments are disclosed.

20 Claims, 10 Drawing Sheets

200

220

260

300

600

PRIVATE TEMPORARY DYNAMIC SECURE NETWORKS AND FIRST RESPONDER NETWORK INTEGRATION

FIELD OF THE DISCLOSURE

The subject disclosure relates to a dynamically establishing private, secure data networks.

BACKGROUND

Network operators serving diverse customers have a need to create a temporary dynamic secure environment that covers a diverse digital footprint on a moment's notice and tear it up upon completing the mission. Such ad hoc networks are needed for particular short-term purposes including those of first responders for reliable, secure data communications.

BRIEF DESCRIPTION OF THE DRAWINGS

Reference will now be made to the accompanying drawings, which are not necessarily drawn to scale, and wherein.

DETAILED DESCRIPTION

Figure 1:
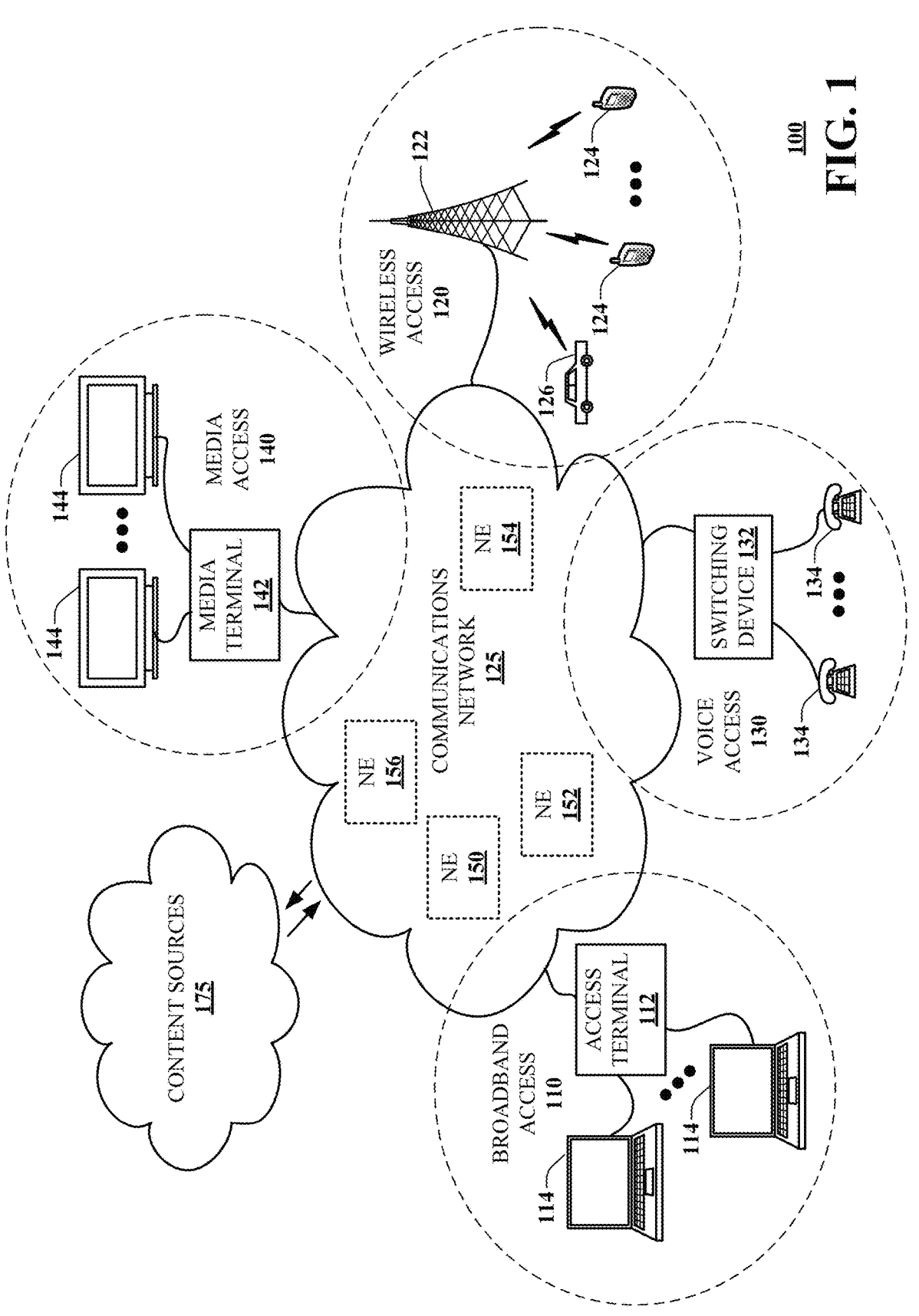
FIG. 1 is a block diagram illustrating an exemplary, non-limiting embodiment of a communications network in accordance with various aspects described herein.

The subject disclosure describes, among other things, illustrative embodiments for a private, temporary, secure data lake with a thin distributed network that enable collaboration among devices of users such as teachers, students, and schools for remote education/work/game sessions. In an example, the secure data lake is used to connect to a school's firewall and network edge gateways and form a private virtual network along with users' devices, including teachers and students. A service provider presents a user interface so school personnel can manually or automatically (e.g., via course number) construct the secure data lake. A token or other data is sent with an invitation to participants for a web conferencing bridge or other collaboration tool. The token holds the password and other credentials to join the collaboration application. Once a participant opens the token, a light application runs in the background to isolate the resources used for the remote lesson so, in embodiments, users are running a virtual machine on their devices that is isolated logically from the host or main device. When users want to share files from the host to the virtual machine, the virtual machine's light firewall scans the file and filters the file against viruses and malware applications. The concepts can be extended from a school environment to the widest range of enterprises. For example, the secure data lake can be communicatively coupled with an emergency response center for securely and reliably contacting first responders in the event of an emergency. Other embodiments are described in the subject disclosure.

One or more aspects of the subject disclosure include receiving information defining a plurality of participants in a secure data lake, receiving access information for the plurality of participants, the access information operative to define respective access to the secure data lake for respective participants, establishing the secure data lake according to the information, wherein the establishing comprises enabling secure communication and data sharing among the participants and limiting access to only the participants, according to the access information, and terminating the secure data lake upon occurrence of a terminating condition.

One or more aspects of the subject disclosure include providing a user interface, the user interface configured to receive participant information about a plurality of participants in a secure data lake and further configured to receive data lake configuration information, the data lake configuration information configured to define a secure data lake for use by the plurality of participants according to the participant information and the data lake configuration information, establishing, in the processing system, the secure data lake, wherein the establishing comprises defining respective access for each respective participant, providing, to each respective participant, access information including secure credentials for admission to the secure data lake according to the respective access for each respective participant, initiating a secure data lake session, including communicating information with respective participants according to the respective access for each respective participant, and terminating the secure data lake session according to the data lake configuration information.

One or more aspects of the subject disclosure include establishing a secure data lake among a plurality of participants in the secure data lake, customizing, by the processing system, access to the secure data lake for each participant of the plurality of participants according to a role of each participant in the secure data lake and according to user equipment of each participant in the secure data lake, detecting an emergency call by a calling participant, the emergency call received within the secure data lake and requesting assistance by the calling participant, instantiating a gateway between the secure data lake and a public safety answering point call center configured to respond to emergency calls, detecting a location of the calling participant, and connecting the emergency call to the gateway for completion of the emergency call between the calling participant and the public safety answering point call center, wherein the connecting comprises providing information about the location of the calling participant.

Referring now to FIG. 1, a block diagram is shown illustrating an example, non-limiting embodiment of a system 100 in accordance with various aspects described herein. For example, system 100 can facilitate in whole or in part building a secure data lake for collaboration among participants. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device

132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
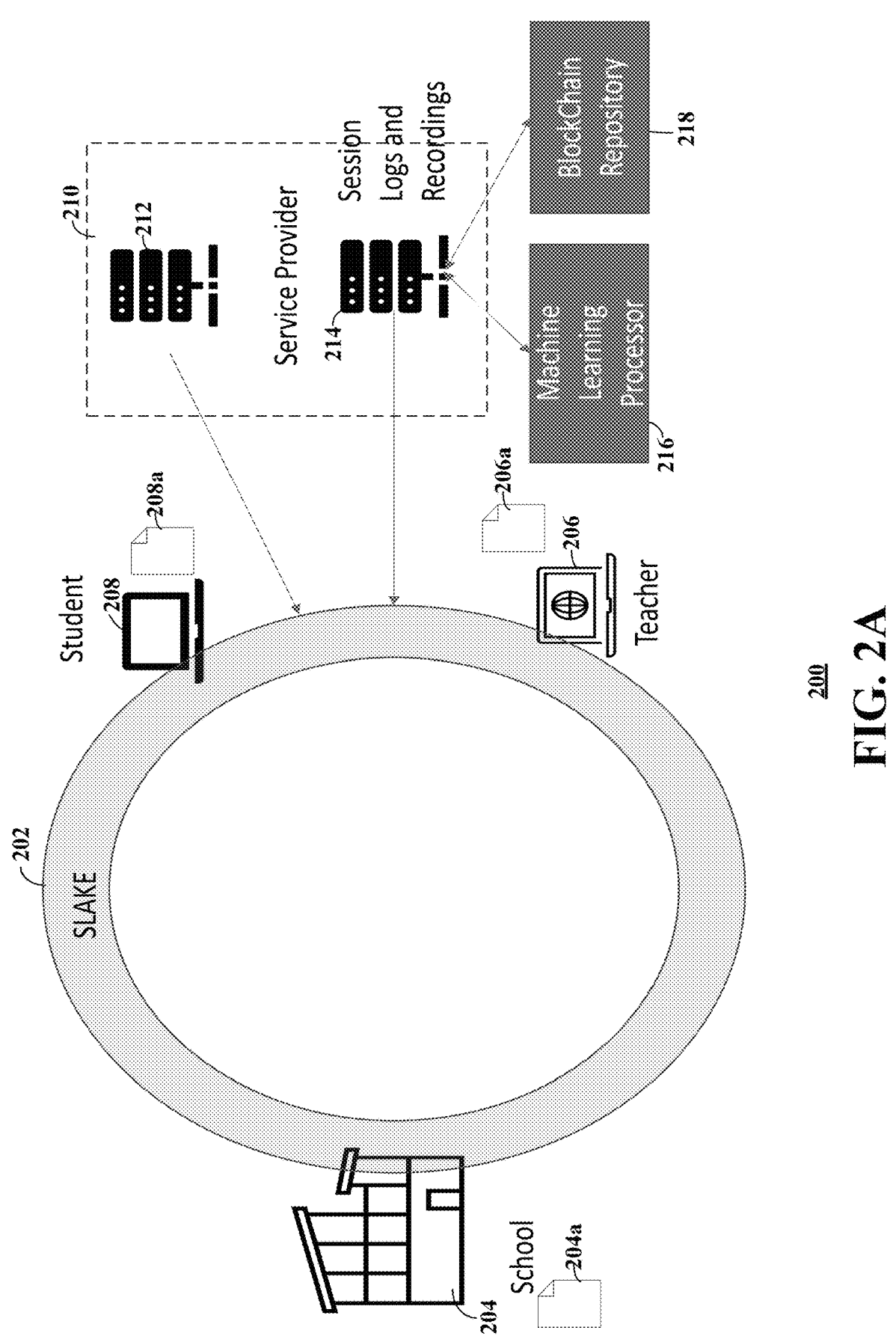
FIG. 2A, FIG. 2B, FIG. 2C and FIG. 2D are block diagrams illustrating example, non-limiting embodiments of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. The system 200 may be used to create a private, temporary, dynamic and secure network for access by a defined set of users. The system 200 establishes a data lake. A data lake may be considered a centralized repository designed to store, process, secure and share large amounts of data. The data may be structured or unstructured. The data can be stored as-is, without further processing to structure the data, and in some examples, the amount of data stored may be unbounded. The data may be processed in any suitable manner, such as by sharing data, developing analytics and for generation of different insights such as through machine learning or artificial intelligence. Usage of the data, and access to the data lake may be tracked through a distributed ledger or other system.

One application for a data lake is in the area of remote education. A class, research collaboration or other group setting may convene online, over a data network. Conventionally, schools or other educational institutions may not have the most secure arrangement for their networks and data stored thereon. For example, the infrastructure may enable access to the network by public Wi-Fi or by computers of users which have been compromised by viruses or malware. The institution may have outdated or never fully up-to-date infrastructure. Even if the institution's infrastructure is reliably secure, the devices used by students and others to access the institution network may have inadequate security features and may transmit computer viruses or other bad software. The institution may not have resources to maintain the best security.

In some instances, the school or another institution or enterprise may establish a data lake for use by a group such as a class of students and instructor. Others may participate at times, as well, such as teaching assistants and parents. The participants may share data and other information stored in the data lake and may interact with one another through network facilities associated with the data lake. The enterprise may connect a very large numbers from all over the world.

However, a conventional data lake in such an application has no centralized unit to establish and maintain a reliable security posture. Security may be left up to individual device owners, network operators and a school firewall or information technology (IT) personnel to each manage their own security profile and requirements. This conventional arrangement may enable attacks and introduce holes for hackers to breach and improperly access users' computers and school or other enterprise networks.

Thus, there is a need for the ability to create a temporary, dynamic, secure environment that covers a diverse digital footprint. The environment may be temporary to satisfy a need for a group such as a class that meets once or twice, occasionally or periodically. The environment may be dynamic in that it may be established and then torn down simply and rapidly, such as after the class meets and is dismissed. The environment should be secure to overcome the noted limitations as well as to secure the data and information of the participants, but the security policies and procedure should be appropriate to the constructed group. Different security policies may be established within the group compared to outside the group. Moreover, to extend to other usages and other groups, the environment should be able to identify and report user's physical locations such as for emergency or 911 purposes. In some areas, 911 emergency services are being extended to over the top, i.e., over the internet, applications. For example, one participant may contact a 911 emergency service on behalf of another participant. Location data should be available in many applications.

The noted solution may be extended to the widest variety of usages where two or more participants need or desire to cooperate or share information. For example, two surgeons may be cooperating on a surgical operation in a hospital for a patient, but one surgeon is located remotely and some remotely located medical students should also participate. They may participate as a group through a secure lake. In another example, a group of first responders must cooperate to handle an emergency situation, such as a fire, a natural disaster or a terrorist encounter. They may share information securely and reliably in a data lake. In fact, where a secure data lake is already established, the first responders may access the secure data lake, such as the data lake used by the surgeons in the hospital or the secure data lake used by the students in the school, for communication among the first responders and with other affected persons. Extending a usage such as a surgical procedure to a first responder network provides advantages to the participants in the surgery. The first responder network (such as the FirstNet network operated by AT&T Corp.) enjoys high priority and other special treatment such as data encryption within a mobility network.

In accordance with various aspects described herein, a private, temporary, secure data lake may be developed for use by a group of two or more participants. The data lake may be referred to as a secure lake or SLAKE. The SLAKE is described as being private because access is limited and controlled; access is not open to the public. The SLAKE is described as being temporary because it is established for a limited purpose for a limited period of time, such as a class, surgery, containment of an emergency situation, a planned event, or other purposes. The SLAKE may be accessible to users' devices such as teachers' computers, student computers, gaming devices, mobile terminals, outer networks of schools and other institutions for remote education, enterprises for work and gaming sessions. The SLAKE may be useful for meetings requiring a high degree of confidentiality and security, such as a corporate board meeting or a governmental conference among agencies.

In embodiments, the SLAKE will connect to and communicate with the firewall of a school or other enterprise along with network edge gateways of the enterprise and form a private virtual network along with the devices of users such as teachers and students. In embodiments, the SLAKE may be part of a service offered by a service provider such as a network operator or data security provider. The service provider may maintain a server and database with suitable software and data for providing and controlling the service to participants at their respective devices. For example, the service provider may expose a user interface so the information technology (IT) function of a school or other enterprise can manually or automatically construct the SLAKE for a class.

In an exemplary embodiment, an administrator such as personnel associated with the IT function may distribute a token to participants to enable access to the SLAKE. The token is sent to participants, such as by electronic mail or otherwise, with an invitation and a link to access a web conferencing bridge or any collaboration tool. This may be done automatically by, for example, specifying information such as a course number and section number to identify the particular course and section. The link or other information may uniquely identify the student or other recipient of the token. Separately, the course number may be used to access a registration database, for example, to identify all students in the class and others who may wish to participate in the SLAKE for the day's course meeting. The token may be specified to operate on a particular device, such as a laptop or desktop computer, a tablet computer, or mobile handset, or the token may be configured to operate on any suitable device, with operations specifically selected for the device on which it is activated.

The token may include information such as a small file that runs on the recipient's device to initiate the access to the server that supports the server, or to the network of the school or other enterprise. The token may contain any suitable data, such as a password or information for two-factor authentication. The token may control configuration for the SLAKE session, such as providing full control by a remote party such as a teacher, activating only and camera, microphone and speaker for face-to-face communication, or activating any application or combination of applications for use by the participant in the SLAKE session. Each respective token for each respective participant may be tailored with information to customize the experience of that participant or to individualize the experience of that participant. For example, the experience may be tailored to the hardware or software of the device the participant uses to access the SLAKE session. In another example, the experience may be tailored based on the role of the participant, such as teacher or student or observer. Information in the token may control how the participant and the participant's device interact with the SLAKE session and other participants in the SLAKE session. The token may initiate a client application on the device of the participant. The token may be encrypted. The token may be set to expire after a set amount of time such as one hour or two hours. After the token expires, it is no longer recognized to provide access to the shared session involving the SLAKE.

In embodiments, the token or a client application on a device of the participant may activate one or more functions. For example, the client application may be pre-loaded on the user's device as a client of the server which provides SLAKE service. The token operates to initialize the application. The application in turn spins up a virtual machine on the user's device. The virtual machine is a computer system created using software on a physical computer such as the participant's device in order to emulate the functionality of another, separate, physical computer. The virtual machine can run programs and deploy applications within the memory space of the participant's device. Following termination of the SLAKE session, the virtual machine may be disabled or torn down and essentially no trace of the SLAKE session remains, ensuring data security and confidentiality.

In embodiments, the client application or token operating on the participant's device spins up a light virus scanner. This is employed to detect and neutralize viruses or malware or other inappropriate software on the participant's device that may affect operation of the SLAKE session or try to extend into the SLAKE session to infect other SLAKE devices. Moreover, the light virus scanner may selectively disable all or portions of a native virus scanner or similar feature operating of the participant's device to prevent a conflict between multiple virus scanners.

Further, in some embodiments, the client application or token spins up a light firewall on the participant's device.

The firewall operates to scan all incoming data to identify and block inappropriate or harmful content such as viruses and malware.

In an example, the token operates to query the participant's device to learn about capabilities and capacities of the device, such as operating system, version number, available memory, etc. The software of the token may then communicate with the server which provides or controls the SLAKE service to obtain data to establish a custom configuration on the participant's device. The configuration is customized to the particular hardware and software of the device. The configuration is customized to the particular requirements of the SLAKE session, such as applications that will be used or accessed, hardware such as camera and microphone that will be accessed, and others. Moreover, if the configuration includes operating a particular video conferencing app, the configuration includes features selected to identify and neutralize known particular vulnerabilities of that video conferencing app. In some embodiments, the client application may include a machine learning model or artificial intelligence module to detect device and network configuration and user behavior and to adapt the SLAKE process, setup and software accordingly. In an example, a machine learning model may determine that the user of the device is a male, based on patterns of usage recorded, for example, as cookie files in a browser, and that the user likes gaming. Based on this learning, the machine learning model may determine to focus on defending against viruses common to gaming.

In some embodiments, the school, enterprise or other organization employing the SLAKE server and client system may employ an on-premises router or gateway. In some embodiments, the SLAKE system may connect to the firewall and network edge gateways employed by the school or other enterprise. The SLAKE system may take control of a network interface or port by managing a gateway with administrative privileges. The SLAKE system may create a software defined network (SDN) for a particular data lake and in turn create tunnels from the data facilities of the school or enterprise to the users or participants in a particular SLAKE session.

Following a setup operation, client applications are installed, optimized and operational on devices of all participants and a firewall is present and operational on each device. Necessary network resources of the school or enterprise are installed and operational for example on one or more network edge gateways of the school or enterprise. The SLAKE session may operate as a distributed system, receiving information from different local instances, aggregating the information and making decisions and control functions based thereon. A portion of the SLAKE session operates on the respective devices of the participants. A portion of the SLAKE session operates on network devices of the school or other enterprise. The SLAKE portion in the school or enterprise network can take some network resources such as central processing unit (CPU) processing cycles and memory for performing scans of the participant devices. For example, the SLAKE process can reserve a portion of resources of the on-premises gateway of the school or enterprise for SLAKE purposes. In other embodiments, the SLAKE session can take any resources such as hardware resources from the participants (such as teachers or students in the online class example) to perform these and other tasks.

Upon completion of the SLAKE set up procedure, one final goal is that files floating inside the data lake of the SLAKE session are secure and everyone is connected to the SLAKE session and data lake has the same security posture.

Any participant who has authorization under the terms of the SLAKE session can access and modify and write data from the data lake.

The SLAKE session may terminate in any suitable manner. For example, in the online class example, after the class is ended, participants close the bridge, the SLAKE session collapses and resources are freed on all hardware used. Provision may be made to store or delete all data as required.

Referring to FIG. 2A, system 200 illustrates an exemplary embodiment of a SLAKE data lake environment in accordance with some aspects described herein. The system 200 includes a secure data lake 202, an enterprise illustrated in this example as a school 204, participants illustrated in this example as a teacher 206 and students including student 208 associated with the school 204. The teacher 206 may be representative of one person or a group of people responsible for a shared activity such as teaching a class or administering the teaching of the class or management of the school 204 or another enterprise. The student 208 may be representative of a group of students or others also participating in the shared activity, such as learning in the class, or another activity of the enterprise. The teacher 206 and the student 208 each correspond to a data processing system such as a personal computer or portable computer used by an individual or group. The data processing systems associated with the teacher 206 and the student 208 access the secure data lake 202 over any suitable wireless or wireline networks or combination of wireless and wireline networks.

The secure data lake 202 includes resources of participants including the teacher 206 and the student 208. For example, a light client application or a token may be established on the data processing system of the participants including the teacher 206 and the student 208. In the example, the data processing system of teacher 20 includes a token 206a. Similarly, the data processing system of teacher 206 includes a token 208a and the data processing system of the school 204 includes a token 204a. The client application or token may identify available resources of the data processing system such as CPU processing cycles and available memory for establishing a firewall and a web conferencing bridge. Any suitable web conferencing system may be used, such as a conventionally available service such as the Teams® system available from Microsoft Corp. or the Zoom® system available from Zoom Video Communications. Alternatively, a custom or proprietary web conferencing bridge may be used. Facilities may be selected upon initiating a session, including audio, video, file sharing, and others. The devices communicate over any suitable network including the public internet.

In the exemplary embodiment of FIG. 2A, a service provider 210 provides a service to clients that may be termed a private, temporary, dynamic secure network. The service enables a shared online activity by individual members of a group such as a class including the teacher 206 and students including the student 208, or another enterprise. The service establishes on the fly a secure data lake such as secure data lake 202 and enables access to the secure data lake 202 by participants such as the teacher 206 and the student 208. The service may include reserving, attaching or selecting various resources such as processing time or processing power, memory for storage, and external network access, for use by participants in the secure data lake 202. The service including access to the lake is private in that participation is limited to invitees or other designated participants only and is not open to the public. The service is temporary in that the service provider establishes the secure data lake 202 and provides network access to participants only for a limited time. The limited time may be for the duration of a class period of a class of the school 204, for a set time duration such as one hour or 24 hours or one week, or any other suitable time. Following the elapse of the limited time, the service provider terminates the service, releases all attached resources such as processing power or memory, and destroys all associated data.

In the exemplary embodiment, the service provider 210 operates a data processing system 212 such as a server computer and database system for establishing, managing and taking down the secure data lake 202. Further, the service provider 210 operates a session log server 214 which maintains session logs and recordings for any sessions established according to the service provided by the service provider 210. In some embodiments, creating, saving and maintaining session logs and recordings may be optional features for a particular data lake. For example, some participants such as the teacher 206 may wish for students such as the student 208 to be able to refer back to materials created during the class or other secure data lake sessions. Other participants may prefer that all traces of the secure data lake session be erased at the end of the session. In general, the information stored and maintained in the session logs of the session log server 214 is maintained securely with access only to participants with appropriate credentials. The stored information may be encrypted.

In the example embodiment of FIG. 2A, the service provider 210 operates a machine learning processor 216 and a block chain repository 218. These may be established using any suitable combination of hardware and software. The machine learning processor 216 may operate to perform pattern recognition and aggregate what participants in multiple secure data lake sessions do and what their requirements are and assist in the process of selecting and building a secure data lake environment by the service provider 210 for future users. For example, the machine learning processor 216 may detect patterns in usage behavior and preferences among differing groups of users and draw conclusions accordingly. In an example, the service provider 210 provides data lake services to middle-school students throughout the country and the machine learning processor 216 may detect common usage elements, such as learning materials used or types of classroom participation. Similarly, if the service provider 210 provides data lake services to university students across a similar geography, the machine learning processor 216 may detect common usage elements for university students. The aggregated information, categorized by different types of participants and different geographies and different age groups, may be used to initialize and establish further secure data lake services for clients.

The blockchain repository 218 or other distributed ledger system may be used to collect and store information about participants. In an embodiment, the blockchain repository 218 may store all historical data as a record of a secure data lake session. For example, as participants enter a secure data lake session, the blockchain repository 218 may collect in a distributed ledger information about each participant, the type of device they use to access the secure data lake session, the time of access and departure, any keystrokes entered or data presented to the participant, and any other pertinent information. The information stored by the blockchain repository 218 may be used for verification purposes subsequent the secure data lake session. In one educational example, such as test-taking, the distributed ledger may record and confirm that an individual did take a prescribed test and provide evidence of the time and manner of test-taking. In the case of a surgical operation, the distributed ledger maintained by the blockchain repository may provide a data recorder storing information from the procedure so that benefits and failures of the surgery can be identified for the participating surgeons.

In embodiments, the system 200 may use any suitable communication technology to connect participants through the secure data lake 202. Such communication technology may include the broadband access 110, the wireless access 120 and the voice access 130 of FIG. 1. Further, participants and communication components may be located in any location having suitable access to a communication network including any geographic location, behind any firewall, etc.

Figure 2B:
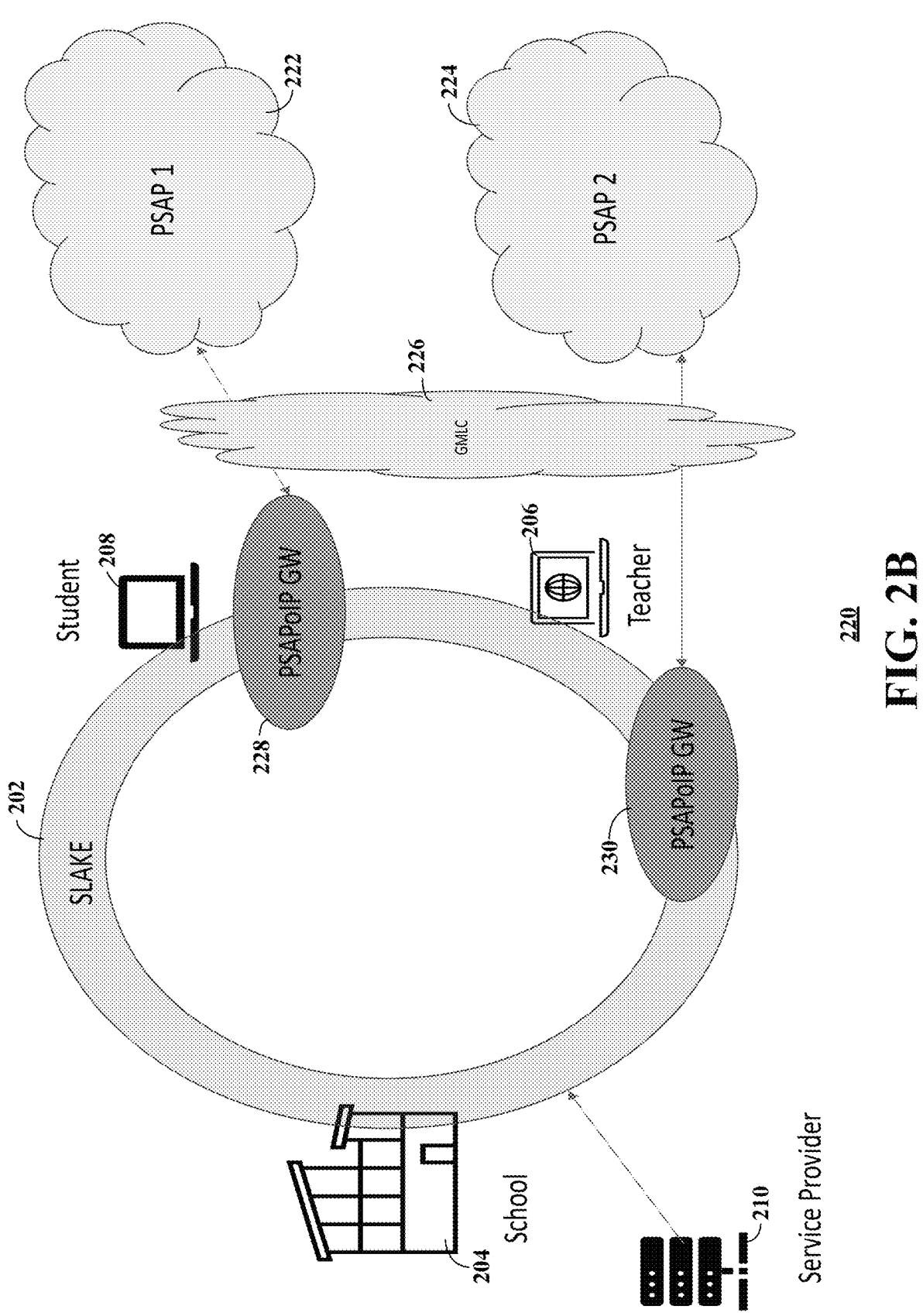

FIG. 2B is a block diagram illustrating an example, non-limiting embodiment of a system 220 functioning within the communication network of FIG. 1 in accordance with various aspects described herein. In particular, the embodiment of the system 220 enables communication between a secure data lake such as secure data lake 202 which relies on internet protocol (IP) data communication and one or more public safety answering points or public safety access points (PSAPs) such as first PSAP 222 and second PSAP 224. A PSAP corresponds to a call center where telephone calls intended for first responders are received and handled. First responders include police, fire department and emergency medical services personnel. A PSAP may receive calls from any landline, mobile phone or voice over internet protocol (VoIP) line. PSAPs are generally capable of caller location in order to help identify the location of an emergency situation requiring a first responder. FIG. 2B illustrates implementation of an IP to PSAP bridge to enable communication between the IP system of the secure data lake 202 and its participants and the first PSAP 222 or second PSAP 224. Each PSAP is tied to a particular geographical area. In embodiments, there may be one or more PSAPs. Two PSAPs are shown FIG. 2B. The system 220 of FIG. 2B enables a call to 911 or emergency services from the Internet.

The first PSAP 222 and the second PSAP 224 are in data communication with respective PSAP over IP gateways (PSAPoIP GW) through a gateway mobile location center (GMLC) 226. Thus, the first PSAP 222 communicates with a first PSAPoIP GW 228 and the second PSAP 224 communicates with a second PSAPoIP GW 230 through the GMLC 226. The GMLC 226 provides support for location-based services. A single mobility network can have multiple GMLCs. The GMLC cooperates with location-based services such as the PSAPs to locate any user that is connected to the mobility network at a given time. The GMLC can provide to network services and authorized third parties standardized subscriber location information access. For example, the GMLC 226 may request routing information for a user equipment device registered with the mobility network from the HLR (Home Location register) or HSS (Home Subscriber Server). The routing information can be shared with the first PSAP 222 and the second PSAP 224. The GMLC 226 will receive location information from a gateway, either first PSAPoIP GW 228 or second PSAPoIP GW 230.

In the event of an emergency situation involving a group participating in a secure data lake such as secure data lake 202 during a defined session such as according to session parameters defined by a token provided to the participants, one or more participants will call 911 or other emergency number to report the emergency situation. They will use their over-the-top, internet access or mobility network access devices to report the emergency situation. The 911 information for the session may be provided in the token to the participants.

The first PSAPoIP GW 228 and the second PSAPoIP GW 230 provides three functions of interest in this embodiment. First, the respective PSAPoIP GW will determine the location of a caller or participant in a session. Further, the PSAPoIP GW will connect to the proper PSAP, such as first PSAP 222 or second PSAP 224 so that the emergency call can be routed properly for handling at the correct location for the location of the caller. In turn, the PSAP will provide a route back or a callback number. The callback number allows the PSAP to assume a telephone number or an over-the-top session for a 911 operator or other emergency service to respond to the call. A callback by the 911 operator may be necessary if the original 911 call is dropped or otherwise terminated but more information is required by the 911 operator. In some instances, where the contact from the emergency caller is made over-the-top (i.e., over the internet), the callback may also be over-the-top and may be in a form other than a voice call, such as a chat box on a web page, a text message exchange, or other two-way communication.

Conventionally, it has been known to configure PSAP access at a cell tower or other radio access network component of a mobility network. In the event of an emergency call or 911 call from a mobile device, the mobility network builds a network tunnel from the mobile device to the appropriate PSAP to handle the emergency call. The PSAP over IP gateway (PSAPoIP GW) in accordance with FIG. 2B provides improved functionality to connect a network device with the appropriate PSAP, based on location.

As noted, the participants in a secure data lake such as secure data lake 202 may be in one location or a variety of geographical locations. The service provider 210 has awareness of the geographical location of each participant. In some cases, and some embodiments, the service provider 210 may determine that a particular participant location corresponds to a different local PSAP network. Proper emergency calling requires that a participant have proper access to the appropriate PSAP serving the current area or location of the participant.

In order to accommodate this requirement, the service provider 210 spins up a software-defined instance of a PSAPoIP GW such as first PSAPoIP GW 228 to serve one or more participants in the secure data lake 202, based on the known location of the one or more participants. Further, the software-defined instance of the PSAPoIP GW is provided by the service provider with information about the participants in the secure data lake 202, their profiles and the architecture of the secure data lake 202.

In some embodiments, each participant in a secure data lake such as secure data lake 202 access facilities of the secure data lake using a personal computer or other data processing system. The personal computer may run an application program (or "app") that is associated with the secure data lake system and may run in conjunction with a web browser or other facility of the personal computer. The app or web browser may provide a user interface which allows the participant to control interaction with the secure data lake 202 and other network facilities and interact with other participants such as a teacher 206 or a student 208. The user interface may further present an emergency actuator such as a graphical button to be clicked or otherwise actuated to indicate an emergency or potential emergency detected by the participant. Actuating the emergency actuator will generate a network message. The network message may include any suitable information such as identity of the participant, identification of a participant who needs assistance, nature of the emergency, and any other suitable information. The network message may be conveyed to the nearest PSAPoIP GW, such as first PSAPoIP GW 228. The nearest PSAPoIP is the one closest geographically to the participant who requires assistance. The selected PSAPoIP converts the VoIP messaging used in the secure data lake 202 and other network equipment to PSAP protocol to connect the emergency call to the appropriate PSAP, such as first PSAP 222. The selected PSAPoIP converts between VoIP and PSAP protocol for the on-going conversation between the participant and the emergency services personnel.

In general, 911 calling or emergency services calling has three important aspects. First, an emergency call from an emergency caller using a mobile device is routed to the appropriate PSAP that handles the specific location so the cell ID and/or the location of the mobile device are sent to the 911 or emergency GMLC 226 for the emergency GMLC 226 to return a proper routing number for the PSAP, such as first PSAP 222 or second PSAP 224 in the example. Second, the emergency call provides the caller location in the form of civic address, such as a dispatchable location or the cell site address for the base station to which the mobile device is connected, and/or the latitude and longitude and altitude or (x, y, z) of the mobile device. The mobile device activates the GPS circuits of the device to generate the GPS latitude and longitude coordinates. Third, the emergency call provides the callback number in case the call drops and service personnel associated with the PSAP can call back to the emergency caller. In case of an over-the-top application originating the call, the call back number could be the IP address of the host device.

In an example, the SLAKE service provided by the service provider 210 will be initiated on a participant's laptop computer or other device by accessing a token or similar data file provided to the device. The token will prompt the device to collect cell site identification data for available nearby cell sites either from a cellular transceiver of the device or by accessing wirelessly or otherwise a mobile phone of the participant and obtaining cell side identification data therefrom. The participant's device collects cell site information from the base stations or other cellular network equipment of the mobility network nearby and uses that collected information to determine its location. The location is then provided to the PSAPoIP GW and then to a PSAP in the event of a 911 or emergency call.

Figure 2C:
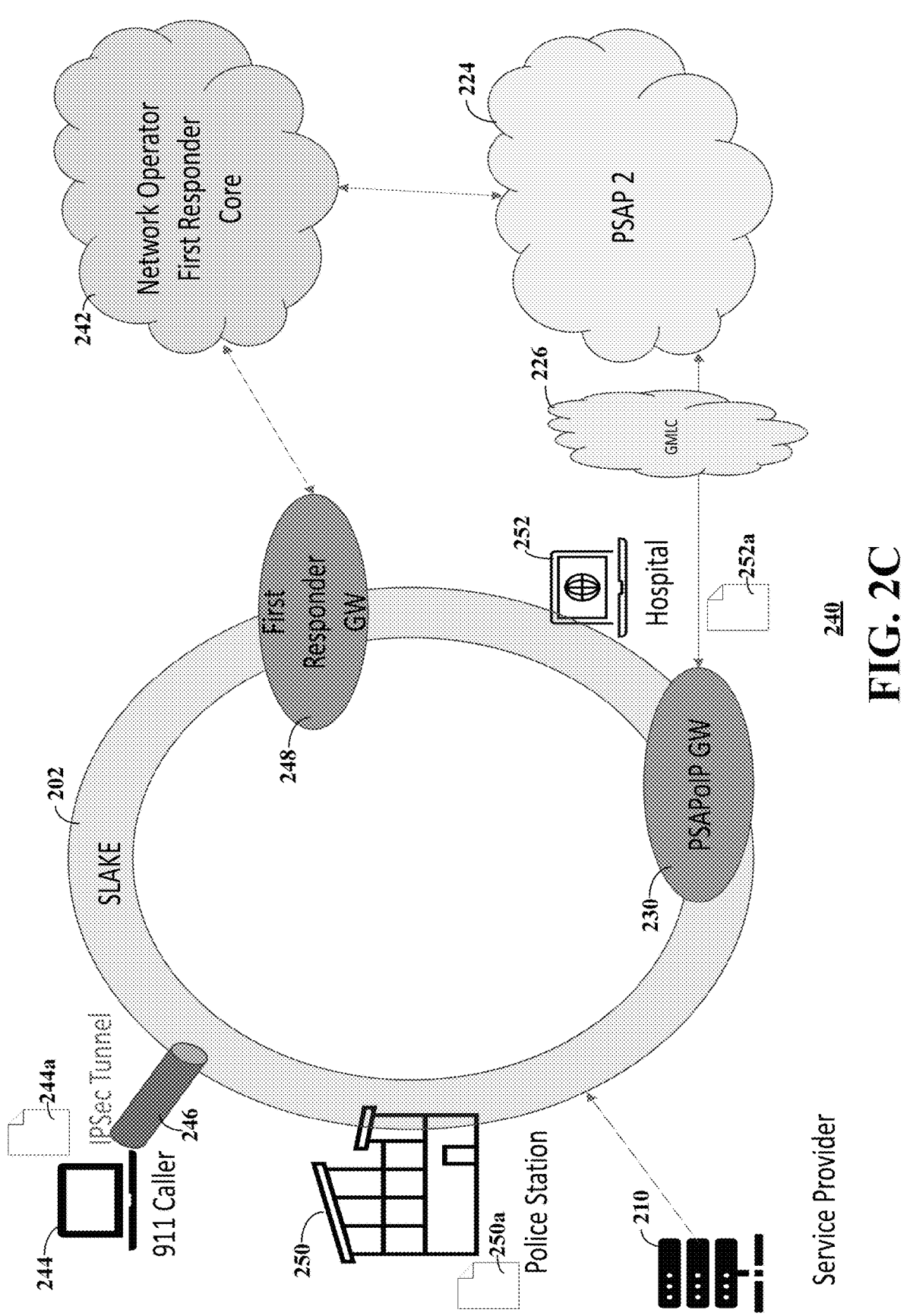

FIG. 2C is a block diagram illustrating an example, non-limiting embodiment of a system 240 functioning within the communication network of FIG. 1 in accordance with various aspects described herein. In FIG. 2C, a secure data lake 202 is established by a service provider 210. In the system 240, a secure data lake 202 used by a group of participants has been expanded to include first responder participants. In an example, a school group or classroom of participants discovers an emergency situation and contacts emergency services, such as by placing a 911 call in accordance with the embodiment of FIG. 2B.

The system 240 includes features specifically for first responders. First, a mobility network operates two core networks including a first core (not shown) for conventional subscribers and routine traffic and a first responder core 242. The first responder core 242 includes devices and networks dedicated to handling emergency, first responder traffic with a high priority and improved security. The core network includes features for mobility management, packet gateway management, and policy control functions. Other features of the mobility network, such as the radio access network (RAN) and transport network, are shared by the first responders and conventional subscribers. The first responder core 242 is dedicated to emergency services.

In the example, a 911 caller or emergency caller 244 has access to the secure data lake 202. The access may be based on a token 244a provided by the service provider 210. In the embodiment, the secure data lake 202 recognizes the emergency caller 244 and identifies the device of the emergency caller 244, for example using the token 244a. The secure data lake 202 can establish a temporary access to the secure data lake 202 through a secure IP tunnel 246 (IP Sec) to the nearest router. The secure IP tunnel 246 or other network connection maintains security of data communicated between the emergency caller 244 and the secure data lake 202. The IPsec protocol adds encryption and authentication to improve security. All traffic to and from the emergency caller 244 is handled as first responder traffic and given a high priority. The secure data lake 202 is established by the service provider with heightened security from intrusion or hacking. In the event of a reported emergency, a first responder gateway 248 is spun up in the secure data lake 202. The first responder gateway 248 provides data communication with the first responder core 242 to provide higher priority and higher security for communications among first responder participants. The secure data lake 202 attempts to obtain the location of the emergency caller 244 and locations of adjacent devices via controlling the host features and signal discovery.

Further, in the event of a reported emergency, the secure data lake 202 is expanded to include additional participants who may contribute to the first responder effort. First, in the example, police communications are added to the secure data lake 202 by adding as a participant data processing equipment associated with a police station 250. The service provider 210 may assign or distribute to the police station 250 a token 250a to enable access to and participation in the secure data lake 202. Similarly, because of the evolving emergency, data facilities of a hospital 225 are added to the secure data lake 202. The service provider 210 may assign or distribute to the hospital 252 a token 252a to enable access to and participation in the secure data lake 202.

In this manner, the police station 250 and hospital 252 and other first responders have an open line for emergency communications. The secure data lake 202, in combination with dedicated first responder facilities such as the first responder gateway 248 and the first responder core 242, ensure that network communications are given a high priority and are secured against intrusion and hacking.

Figure 2D:
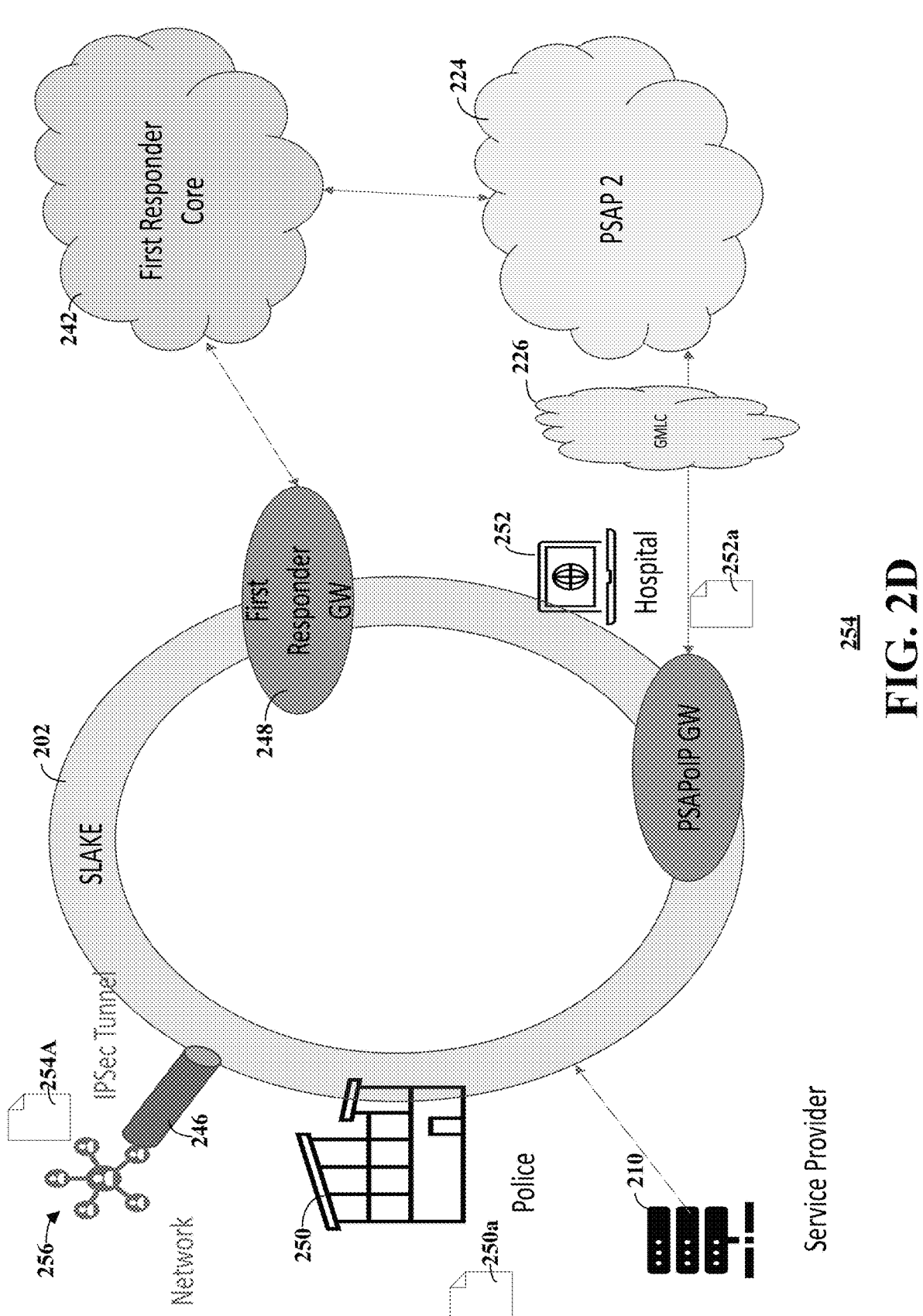

FIG. 2D is a block diagram illustrating an example, non-limiting embodiment of a system 254 functioning within the communication network of FIG. 1 in accordance with various aspects described herein. Similar to the example embodiment of FIG. 2C, a secure data lake 202 is established by a service provider 210. In the system 254 in FIG. 2D, the secure data lake 202 used by a group of participants has been expanded to include an entire network 256. In an example the network 256 is associated with an organization that can appropriately participate in a first responder situation. The network 256 may in some instances be geographically diverse with users in many locations.

For example, the network 256 may be associated with a hospital that has multiple facilities that communicate over a private network such as the network 256. By means of one or more tokens such as token 256a, the network 256 is given access to the secure data lake 202 and to the benefits of secure data communication with the first responder facilities such as the first responder core 242 through the first responder gateway 248.

Further, the devices connected by the network 256 may be selected based on a particular function or expertise. In an example, the emergency situation relates to a chemical spill or other toxic substance. In order to engage the best experts and the most up-to-date information and facilities, they may be identified and connected by an existing or ad hoc network including network 256. In this manner, the experts may rapidly and securely communicate, and their expertise may be brought to bear on solving the emergency situation. The network 256 and the secure data lake 202 may be temporarily set up, connecting the required participants, and may be torn down when the use is ended.

In another example, the emergency situation arises at a school or other enterprise. The facilities of the school or enterprise are connected for data communication through the network 256. As the emergency situation evolves, the network 256 can be added to the secure data lake 202 to enable first responder communication throughout the school or enterprise. All devices of the school or enterprise join the secure data lake 202 used by the first responders. Traffic from the device of network 256 will be routed to the higher priority paths including the first responder core 242.

The secure data lake 202 identifies the devices of the network 256 and establishes a temporary IP see tunnel 246 to the nearest router to the network 256. Subsequently, all traffic to and from the network 256 is labeled first responder traffic for the duration of the emergency situation.

Figure 2E:
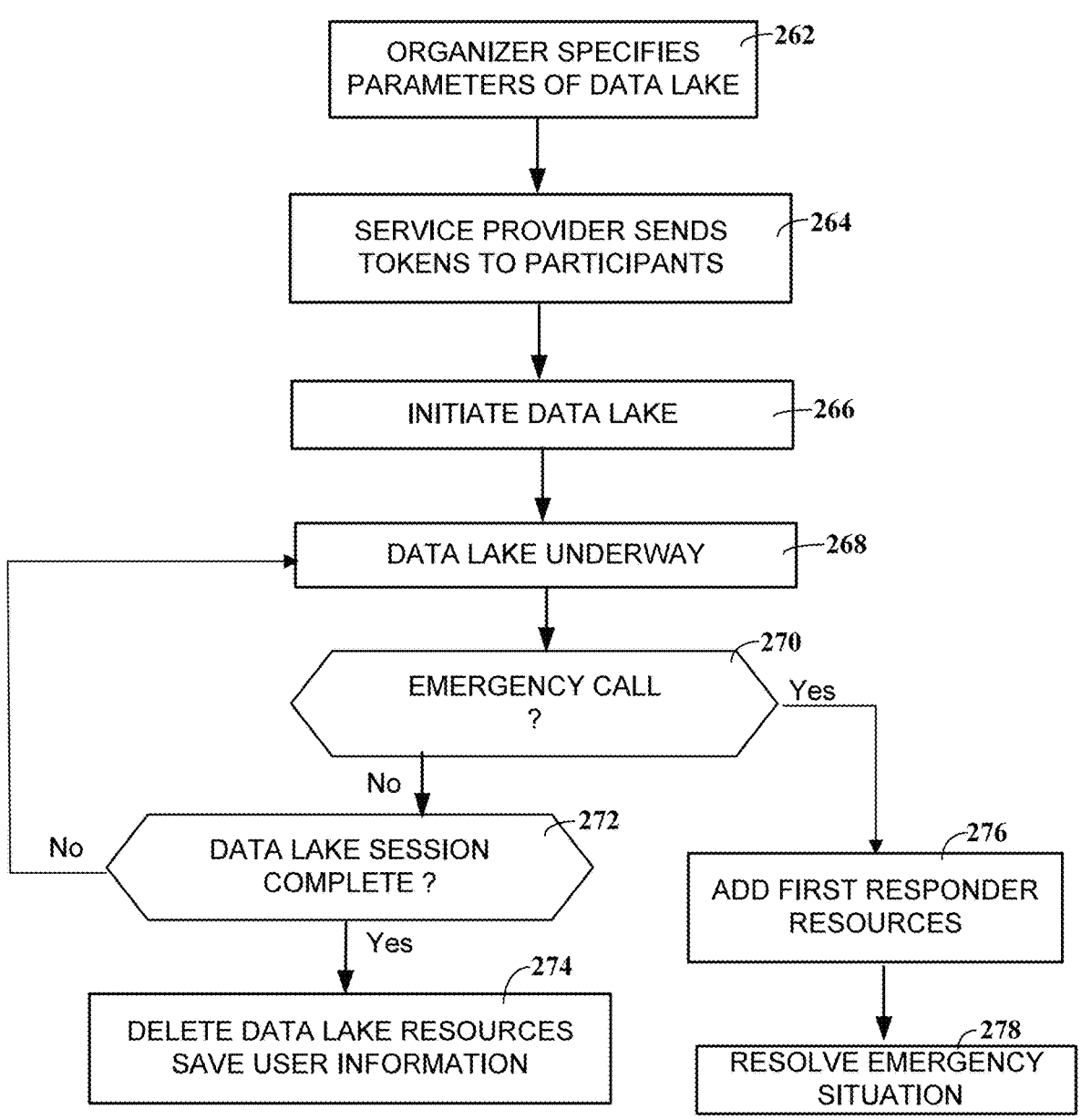
FIG. 2E depicts an illustrative embodiment of a method in accordance with various aspects described herein.

FIG. 2E depicts an illustrative embodiment of a method 260 in accordance with various aspects described herein. The method 260 may be performed in conjunction with any suitable data processing system or combination of such systems. The method 260 may be initiated in any suitable manner, such as by initiating an online process or activating an application of a server or client. The method 260 may be used to implement, operate and terminate a secure data lake in accordance with aspects described in conjunction with FIGS. 2A through 2D.

At step 262, an organizer of a secure data lake specifies parameters of the secure data lake. The secure data lake may be referred to as SLAKE. The secure data lake may be tailored to any particular purpose of its participants, and to any physical requirements the participants may have. The organizer may be any suitable person or process. In an example, the organizer is a person who accesses a user interface to specify the parameters of the data lake. The user interface may be a web site accessed over a network for example and may be provided by a service provider. The service provider maintains servers and other equipment to implement the SLAKE and provides the web site for the organizer.

The organizer may specify any suitable parameters. These may include identification information for all participants, role information for respective participants such as "teacher," "student," "parent," "observer." Further, the organizer may specify particular capabilities for each participant. In the example, the teacher may be given superuser capabilities to control all aspects of the data lake session. The observer may be given minimal capabilities to simply hear and see proceedings of the data lake session. The parameters may be tailored to each participant's role.

Further, the organizer may specify other features of the SLAKE session, such a time duration of the session or a set of sessions, scheduling of each session, and termination of the session. Further, the organizer may specify how data and other information of the SLAKE session are treated upon termination of the session. For example, all commonly shared data may be destroyed upon termination of the session, or individual user data may be retained, or some common data may be retained for a specified time period.

Further, the organizer may specify tools to be available during the SLAKE session. For example, a whiteboard may be accessible to some or all users during the session to visually share information. The organizer may specify that some data files may be made available for the session, such as a video or audio file to be presented or a slide presentation to be presented. The organizer may specify any applications that should be available during the SLAKE session, such as spreadsheets, slide decks, video players, social media gateways, and others. Any other information that may be pertinent to the SLAKE session may be specified by the organizer.

In some embodiments, the service provider may have SLAKE session templates available. Each template specifies a set of parameters for a typical SLAKE session by a group with a particular interest. There may be a "class" template, and a "board meeting" template, and any number of other templates that may be accessed and customized for a particular purpose by an organizer.

At step 264, a service provider or other party distributes tokens to participants. Any suitable token may be used. In general, the token is a data file that may include executable code operable on a device of a participant. Each respective participant is sent a respective token. In general, each respective token includes information tailored to the respective participant. The token may include at a minimum credentials for accessing the SLAKE session at a designated time and network location. The token may further include details for controlling the device of the user during the SLAKE session. In one example the token includes a light virus scanner that operates to scan the device of the participant to prevent the sharing of any viruses or malware from the user device to the other participants in the SLAKE session, and to prevent any viruses or malware from being transmitted to the user device.

Any other suitable information and functions may be contained in the tokens distributed to the participants. In other embodiments, the information may be communicated to participant devices in any suitable manner. For example, a client application may operate on each participant device and, using received credentials, access a server of the service provider to download necessary information and initiate access to the SLAKE session.

At step 266, the secure data lake session is initiated. The session is conducted according to the parameters and participants specified by the organizer in step 262. The SLAKE session may be initiated in any suitable manner, and each participant may access the session in any suitable manner. In some examples, location information may be collected for some or all participants. Location information may include any suitable information for identifying locations of participants, such as street addresses, latitude-longitude information, and others. At step 268, the data lake session is underway according to the established parameters.

At step 270, the method 260 includes determining if an emergency call is made or requested. Such a call may occur for any reason and may be related to conditions at a location where one or more participants are located. One participant may call for help for that participant or for another participant. The secure data lake session may respond to the emergency call in any suitable manner.

If no emergency call is identified, control proceeds to step 272 and it is determined if the data lake session is complete. Completion may be determined in any suitable manner. The session may reach its predetermined time duration. The participants may end the session by logging off or otherwise exiting the session. If the SLAKE session is not complete, control returns to step 268.

If the SLAKE session is complete, at step 274, session termination procedures are implemented. The termination procedures may be specified, for example, by the organizer at step 262. Alternatively, the termination procedures may be a standard set of operations according to a template which occur when the SLAKE session ends. In examples, the data of the data lake may be deleted. Other information of the SLAKE session, such as participant identification, may be deleted or retained. Individual participants may retain or delete their own respective information.

If, at step 270, an emergency call was identified, control proceeds to step 276. At step 276, suitable first responder assets may be added to the secure data lake session. For example, a PSA over IP gateway may be instantiated on the SLAKE session to enable direct communication with a PSAP or similar resource. In another example, resources such as remote participants with particular expertise to contribute to resolution of the emergency may be added to the SLAKE session. In general, SLAKE communications are maintained with a high level of security and with resistance to viruses and other malware. Enabling direct communication from the SLAKE session to a PSAP or similar resource shares the high network priority of first responder communications in a first responder network with SLAKE users. The SLAKE users inside the SLAKE session and first responders may cooperate together to resolve the emergency situation, step 278.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
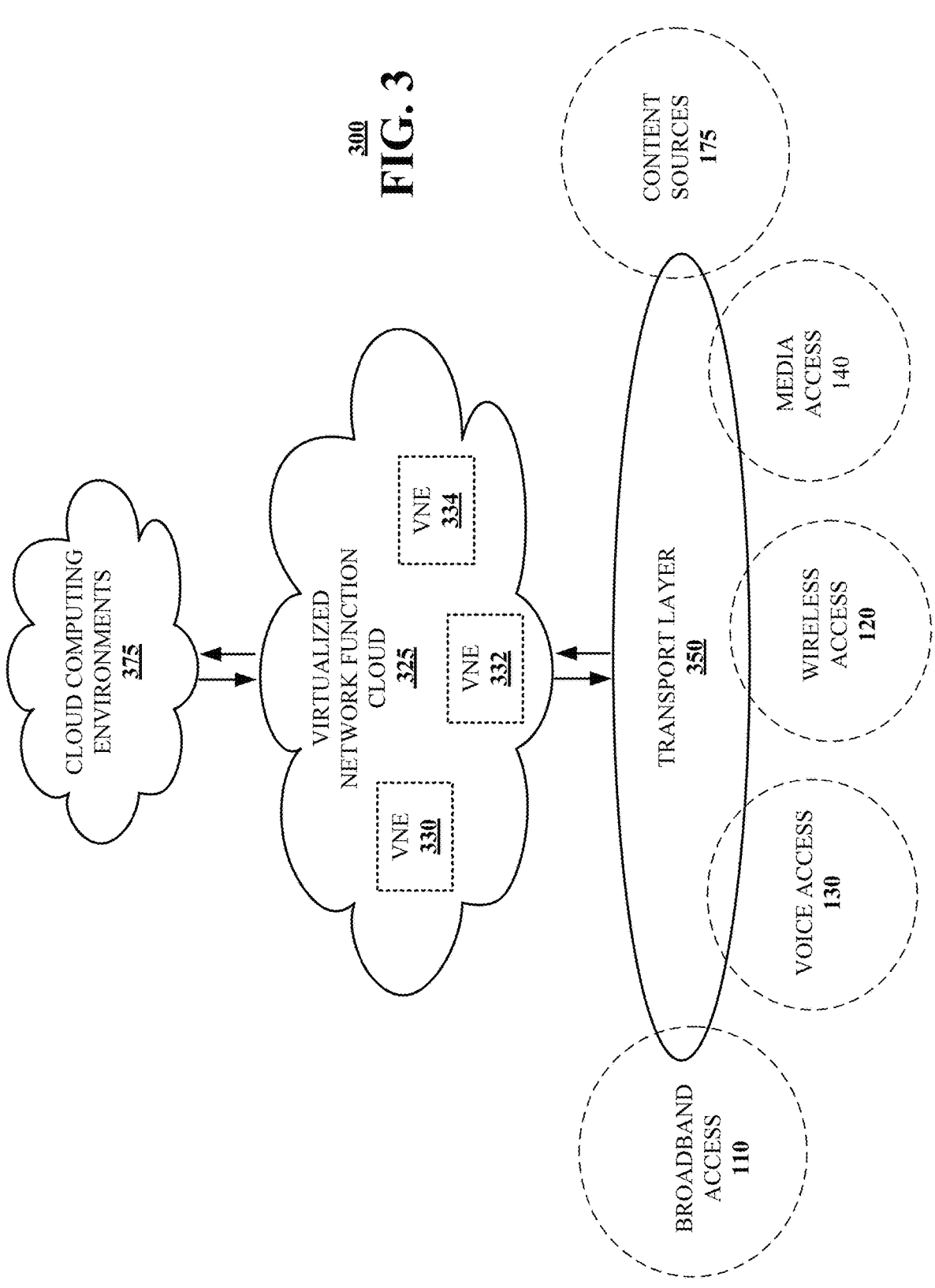
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network in accordance with various aspects described herein. In particular a virtualized communication network 300 is presented that can be used to implement some or all of the subsystems and functions of system 100, the subsystems and functions of system 200, system 220, system 240, system 254, and method 260 presented in FIG. 1, FIG. 2A, FIG. 2B, FIG. 2C, FIG. 2D, FIG. 2E and 3. For example, virtualized communication network 300 can facilitate in whole or in part establishing a secure data lake for secure network access by a group of participants including first responders to emergency situations.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
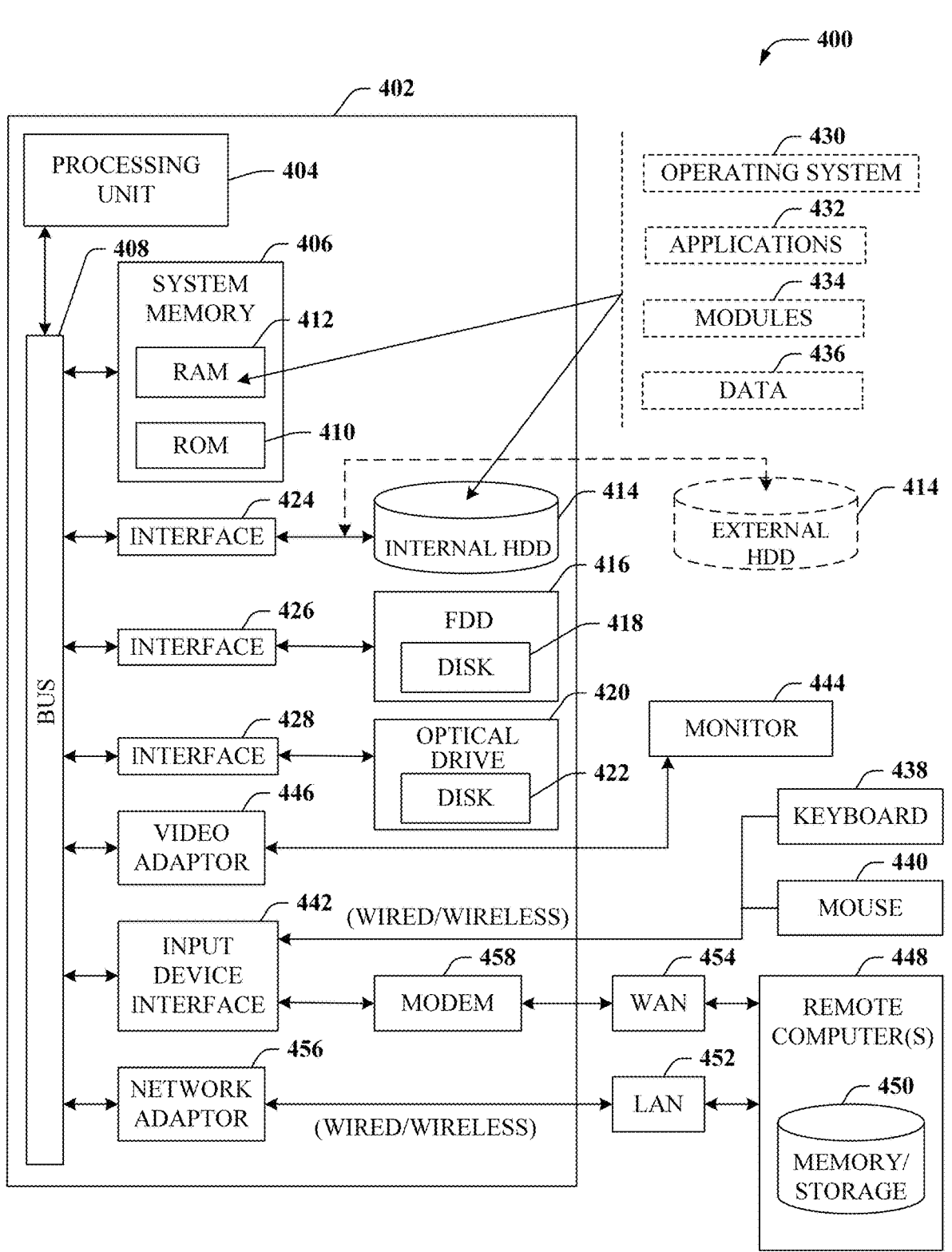
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part establishing a secure data lake for secure network access by a group of participants including first responders to emergency situations.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are examples and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
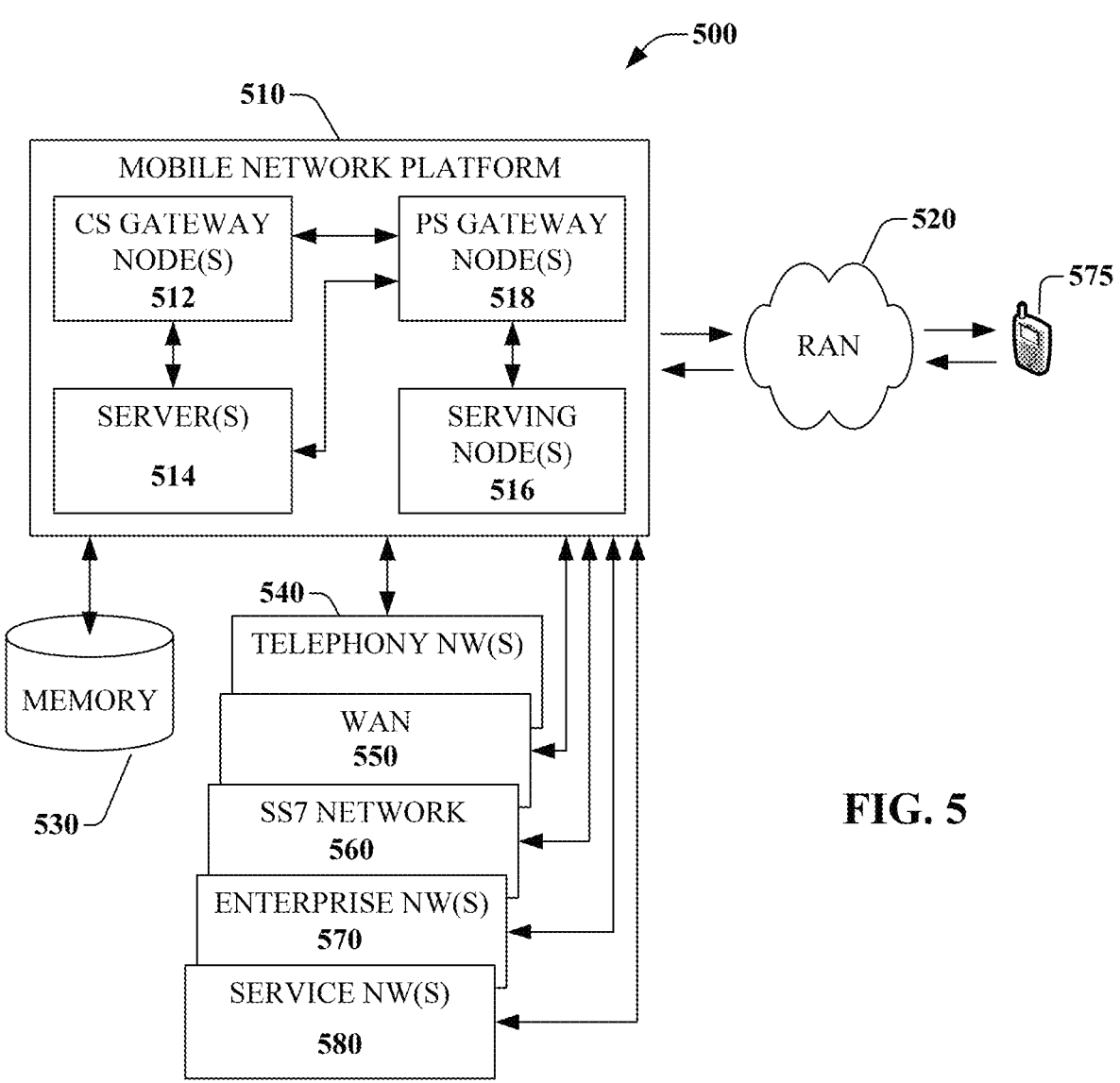
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part establishing a secure data lake for secure network access by a group of participants including first responders to emergency situations. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flatrate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
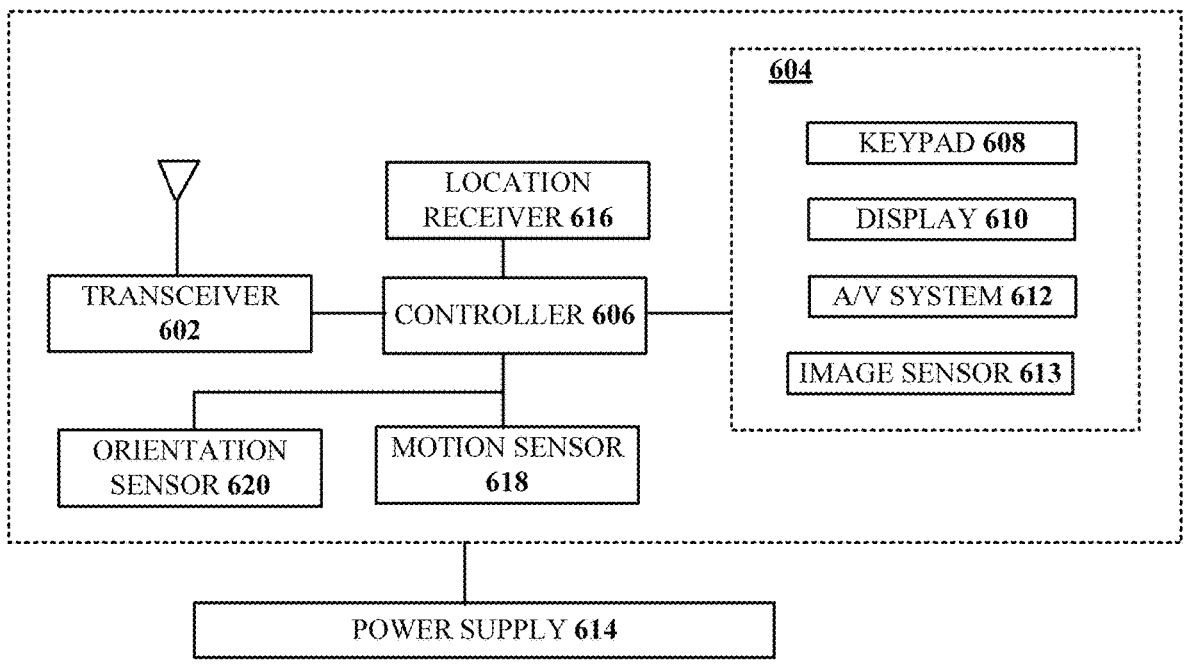
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part establishing a secure data lake for shared access by a group of participants.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and
   a memory that stores executable instructions that, when executed by the processing system, facilitate performance of operations, the operations comprising:
   receiving information defining a plurality of participants in a private and temporary secure data lake;
   receiving access information for the plurality of participants, the access information operative to define respective differentiated access, including user-specific role-based interaction limits, tailored device-specific configurations for devices of the plurality of respective participants, and session-specific application accessibility to the private and temporary secure data lake for respective participants;
   establishing the private and temporary secure data lake according to the information defining the plurality of participants and the access information, wherein the establishing comprises:
      dynamically tailoring security policies for the respective participants based on user and device attributes,
      deploying tailored light firewall instances on the devices of the participants, and
      deploying virtual machine instances on the devices of the participants;
   enabling secure communication and data sharing among the participants and limiting access to only the participants, according to the access information; and
   terminating the private and temporary secure data lake upon occurrence of a terminating condition, wherein the terminating comprises:
      destroying the tailored light firewall instances and the virtual machine instances on the devices of the participants to remove data of the private and temporary secure data lake.

2. The device of claim 1, wherein the operations further comprise:
   communicating tokens to the participants, wherein communicating the tokens comprises communicating network information enabling network access by devices of the participants and communicating credentials enabling secure network access to the private and temporary secure data lake.

3. The device of claim 2, wherein the operations further comprise:
   receiving information defining a device type and operating system information for the respective participants; and

tailoring, for the respective participants, respective tokens with information to customize access to the private and temporary secure data lake for respective participants.

4. The device of claim 3, wherein the tailoring the respective tokens comprises:

providing, in the respective tokens, role information specific to a respective role in the private and temporary secure data lake of the respective participants.

5. The device of claim 3, wherein the operations further comprise:

providing, in the respective tokens, interaction information, the interaction information defining how the respective participants interact with the private and temporary secure data lake.

6. The device of claim 3, wherein the operations further comprise:

providing, in the respective tokens, application information, wherein the application information defines one or more applications of the devices of the participants that may access the private and temporary secure data lake.

7. The device of claim 1, wherein the operations further comprise:

receiving, from a participant in the private and temporary secure data lake, an emergency call requesting emergency services;

determining, a location of the participant; and communicating information about the participant and the location of the participant to a public safety access point for handling the emergency call.

8. The device of claim 7, wherein the operations further comprise:

determining, from a mobility network serving device of the private and temporary secure data lake, location information about the location of the participant; and communicating, from the private and temporary secure data lake to the public safety access point the location information about the location of the participant.

9. The device of claim 8, wherein the operations further comprise:

instantiating a gateway between the private and temporary secure data lake and the public safety access point; and providing, to the gateway, the location information about the location of the participant for conversion by the gateway from internet protocol (IP) information to PSAP protocol information.

10. The device of claim 1, wherein the operations further comprise:

communicating user data between the private and temporary secure data lake and a first provider network, wherein the user data is communicated according to a priority and a data security level of first provider data communicated on the first provider network.

11. A non-transitory machine-readable medium, comprising executable instructions that, when executed by a processing system including a processor, facilitate performance of operations, the operations comprising:

providing a user interface, the user interface configured to receive individualized participant information comprising device attributes, user roles, and runtime behavioral context about a plurality of participants associated with participant devices in a private, temporary secure data lake, the user interface further configured to receive data lake configuration information, the data lake configuration information comprising instructions to activate tailored light firewalls and virtual machines on the participant devices of respective participants of the plurality of participants, to enable runtime customization of secure environments and secure communication;

establishing, in the processing system, the private, temporary secure data lake, wherein the establishing comprises defining respective access for each respective participant, including tailoring security privileges for each respective participant, wherein the establishing the private, temporary secure data lake is based on the individualized participant information and the data lake configuration information;

instantiating the private, temporary secure data lake for access by participants of the plurality of participants;

providing, to each respective participant, access information including secure credentials for admission to the private, temporary secure data lake according to the respective access for each respective participant;

initiating a secure data lake session, including communicating information with respective participants according to the respective access for each respective participant; and terminating the secure data lake session according to the data lake configuration information, wherein the terminating comprises deleting of the tailored light firewalls.

12. The non-transitory machine-readable medium of claim 11, wherein the operations further comprise:

receiving, for each respective participant, device information about a data processing device and an operating system associated with the respective participant for communicating information of the secure data lake session with the respective participant; and configuring respective access for the respective participant according to the device information.

13. The non-transitory machine-readable medium of claim 11, wherein the operations further comprise:

receiving, for each respective participant, role information, the role information defining a type of participation for the respective participant in the secure data lake session; and configuring respective access for the respective participant according to the role information.

14. The non-transitory machine-readable medium of claim 11, wherein the operations further comprise:

detecting an emergency call by a calling participant of the private, temporary secure data lake, the emergency call directed to a first responder call center to request emergency services;

detecting a location of the calling participant; and communicating, to the first responder call center, information about the calling participant and the location of the calling participant to complete the emergency call between the calling participant and the first responder call center.

15. The non-transitory machine-readable medium of claim 11, wherein providing a user interface comprises:

providing at a network accessible location a website of a service provider, the service provider operating a data processing system to establish the private, temporary secure data lake for the plurality of participants.

16. The non-transitory machine-readable medium of claim 11, wherein the terminating the secure data lake session comprises:

detecting exit of all participants from the secure data lake session;

deleting all common data of all participants of the secure data lake session; and retaining all personal data of all participants of the secure data lake session.

17. A method, comprising:

establishing, by a processing system including a processor, a private, temporary secure data lake among a plurality of participants in the private, temporary secure data lake;

customizing, by the processing system, access to the private, temporary secure data lake for each participant of the plurality of participants according to a role of each participant in the private, temporary secure data lake and according to device attributes and operating system environments of user equipment of each participant in the private, temporary secure data lake, and enabling run-time instantiation of tailored light firewalls and isolated virtual machines on the user equipment of each participant in the private, temporary secure data lake;

instantiating the private, temporary secure data lake for access by participants of the plurality of participants, including the tailored light firewalls and the isolated virtual machines on the user equipment of the participants;

detecting, by the processing system, an emergency call by a calling participant, the emergency call received within the private, temporary secure data lake and requesting assistance by the calling participant;

instantiating, by the processing system, a temporary gateway between the private, temporary secure data lake and a public safety answering point call center configured to respond to emergency calls;

detecting, by the processing system, a location of the calling participant;

connecting, by processing system, the emergency call to the temporary gateway for completion of the emergency call between the calling participant and the public safety answering point call center, wherein the connecting comprises providing information about the location of the calling participant; and terminating, by the processing system, the temporary gateway and the private, temporary secure data lake upon completion of the emergency call including terminating the tailored light firewalls and the isolated virtual machines on the user equipment.

18. The method of claim 17, comprising:

providing, by the processing system, a user interface configured to receive information about the role of each participant in the private, temporary secure data lake and the user equipment of each participant in the private, temporary secure data lake.

19. The method of claim 18, comprising:

receiving, by the processing system, at the user interface, information defining a termination condition for the private, temporary secure data lake.

20. The method of claim 19, comprising:

terminating, by the processing system, the private, temporary secure data lake, wherein the terminating is according to the termination condition, wherein the terminating comprises deleting all data of the private, temporary secure data lake and identifying information of the plurality of participants.

* * * * *